(12) United States Patent
Asano et al.

(10) Patent No.: US 9,346,173 B2
(45) Date of Patent: May 24, 2016

(54) ROBOT

(71) Applicant: CANON KABUSHIKI KAISHA, Tokyo (JP)

(72) Inventors: Hidetada Asano, Kawasaki (JP); Kazunori Ogami, Tokyo (JP); Akihiro Kimura, Kawasaki (JP); Takayuki Ogawara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 13/932,222

(22) Filed: Jul. 1, 2013

(65) Prior Publication Data

US 2014/0013893 A1    Jan. 16, 2014

(30) Foreign Application Priority Data

Jul. 12, 2012   (JP) ................. 2012-156785
May 9, 2013    (JP) ................. 2013-099323

(51) Int. Cl.
*B25J 18/00*      (2006.01)
*H02G 15/00*    (2006.01)
(Continued)

(52) U.S. Cl.
CPC ............. *B25J 18/00* (2013.01); *B25J 19/0025* (2013.01); *B25J 19/0029* (2013.01);
(Continued)

(58) Field of Classification Search
CPC .... B25J 18/00; B25J 19/0025; B25J 19/0029; F16L 3/00; F16L 3/01; F16L 3/04; F16L 3/12; H02G 3/22; H02G 3/32; H02G 3/30; H02G 11/00; Y10S 901/27; Y10S 901/50; Y10T 74/20311

USPC ........ 248/274.1, 65, 74.1; 74/490.02, 490.03; 901/15, 27, 50
See application file for complete search history.

(56) References Cited

U.S. PATENT DOCUMENTS 1,835,338 A * 12/1931 Rossman ................. 403/385
4,705,243 A * 11/1987 Hartmann et al. ............ 248/51
(Continued)

FOREIGN PATENT DOCUMENTS

CN       100586668 C      2/2010
CN       102431041 A      5/2012
(Continued)

OTHER PUBLICATIONS

Sep. 25, 2013 European Search Report in European Patent Application No. 13175846.8.
(Continued)

*Primary Examiner* — Anita M King
(74) *Attorney, Agent, or Firm* — Fitzpatrick, Cella, Harper & Scinto

(57) ABSTRACT

A robot, includes: a robot arm including: a first frame; and a second frame coupled to the first frame to be turnable about a joint axis; a cable arranged along a side surface of the first frame and a side surface of the second frame; a first fixing member for fixing the cable to the side surface of the first frame; a second fixing member for fixing the cable to the side surface of the second frame; a holding member for holding a part of the cable between the first fixing member and the second fixing member; and a support mechanism for regulating movement of the holding member in an axis direction of the joint axis, the support mechanism supporting the holding member so that the holding member is movable in a direction orthogonal to the axis direction of the joint axis to follow a bending movement of the cable.

9 Claims, 16 Drawing Sheets

(51) Int. Cl.
*B25J 19/00* (2006.01)
*H02G 11/00* (2006.01)
*H02G 3/22* (2006.01)
*H02G 3/32* (2006.01)

(52) U.S. Cl.
CPC .............. *H02G 11/00* (2013.01); *H02G 15/00* (2013.01); *H02G 3/22* (2013.01); *H02G 3/32* (2013.01); *Y10S 901/27* (2013.01); *Y10T 74/20311* (2015.01)

(56) References Cited

U.S. PATENT DOCUMENTS

| | | | |
|---|---|---|---|
| 5,437,207 A * | 8/1995 | Zimmer | 74/490.02 |
| 6,230,859 B1 * | 5/2001 | Springmann | 191/12 R |
| 7,322,258 B2 * | 1/2008 | Shiraki et al. | 74/490.05 |
| 7,703,349 B2 | 4/2010 | Nihei et al. | |
| 8,720,296 B2 * | 5/2014 | Yonehara et al. | 74/490.02 |
| 9,197,052 B2 * | 11/2015 | Kume | H02G 11/00 |
| 9,233,475 B2 * | 1/2016 | Kume | B25J 19/0025 |
| 9,238,556 B2 * | 1/2016 | Kuhn | B65G 1/02 |
| 2002/0130513 A1 * | 9/2002 | Berninger et al. | 285/45 |
| 2005/0172606 A1 * | 8/2005 | Wehler et al. | 59/78.1 |
| 2006/0104791 A1 * | 5/2006 | Nihei et al. | 414/737 |
| 2012/0067157 A1 | 3/2012 | Suzuki et al. | |
| 2012/0111135 A1 * | 5/2012 | Ichibangase et al. | 74/490.06 |
| 2014/0030032 A1 * | 1/2014 | Kuhn | 406/196 |
| 2015/0027261 A1 * | 1/2015 | Okahisa et al. | 74/490.02 |
| 2015/0034698 A1 * | 2/2015 | Takahashi et al. | 228/33 |

FOREIGN PATENT DOCUMENTS

| | | |
|---|---|---|
| DE | 10245984 A | 4/2004 |
| JP | 61-297096 A | 12/1986 |
| JP | 63-010091 A | 1/1988 |
| JP | 63-039416 A | 2/1988 |
| JP | 04-111795 A | 4/1992 |
| JP | 09-314492 A | 12/1997 |
| JP | 10-34588 A | 2/1998 |
| JP | 2004-98174 A | 4/2004 |

OTHER PUBLICATIONS

Jan. 20, 2014 European Search Report in European Patent Application No. 13175846.8.

Chinese Office Action issued in Chinese Application No. 201310285463.2, dated Feb. 27, 2105.

* cited by examiner

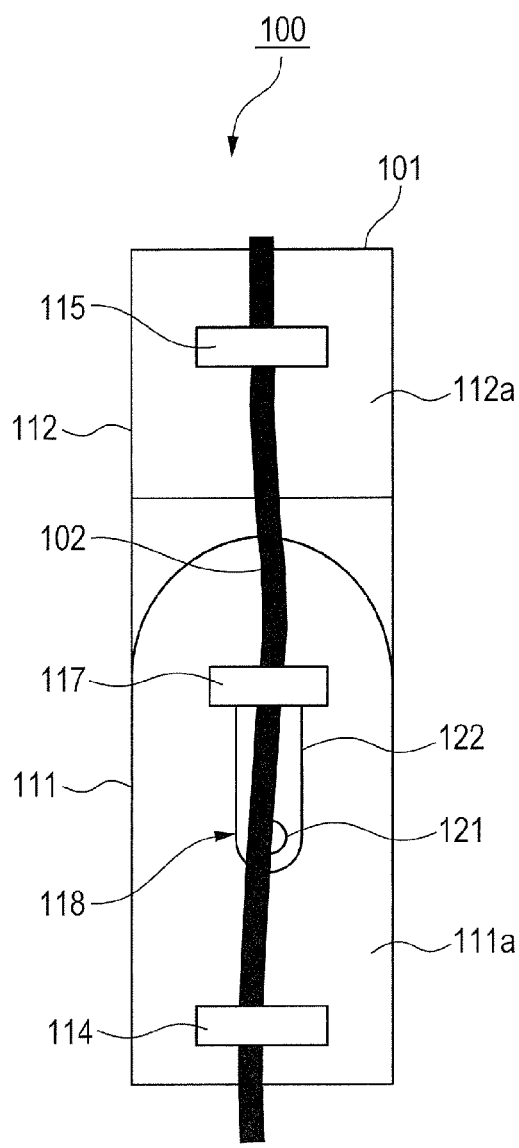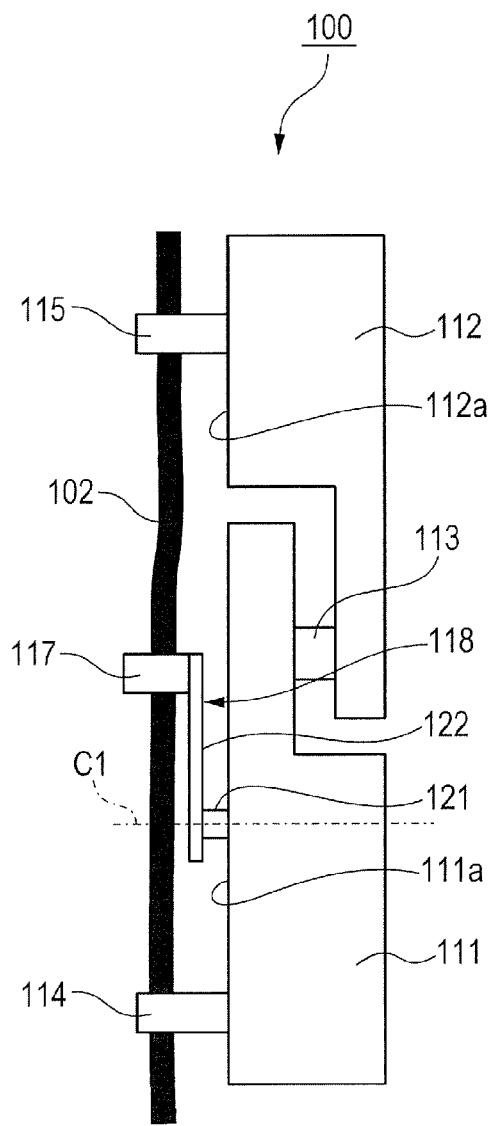

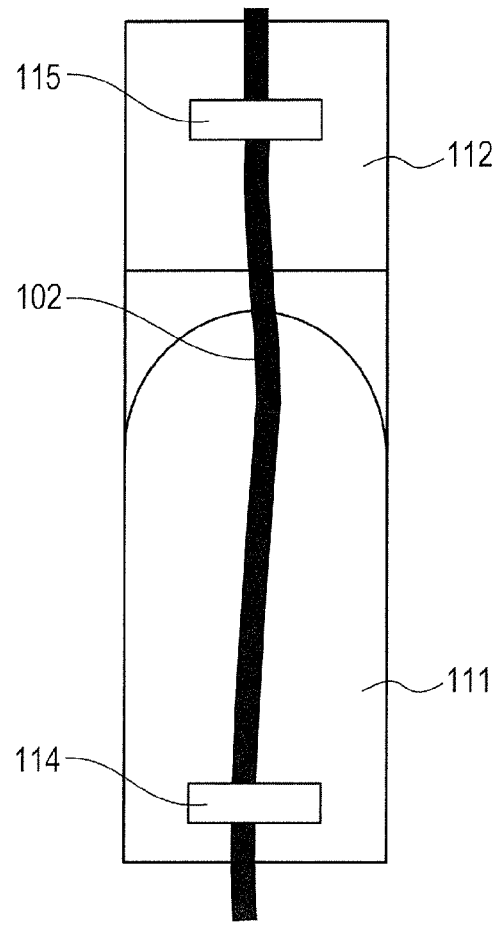 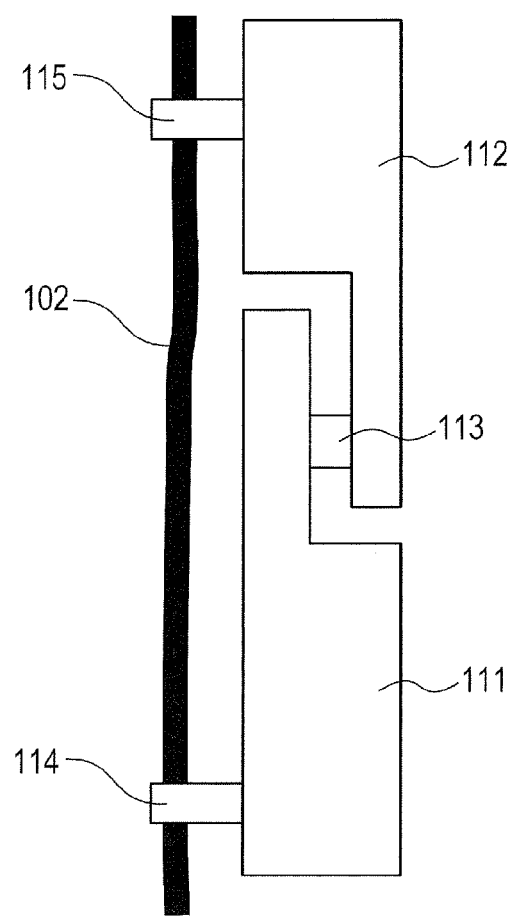

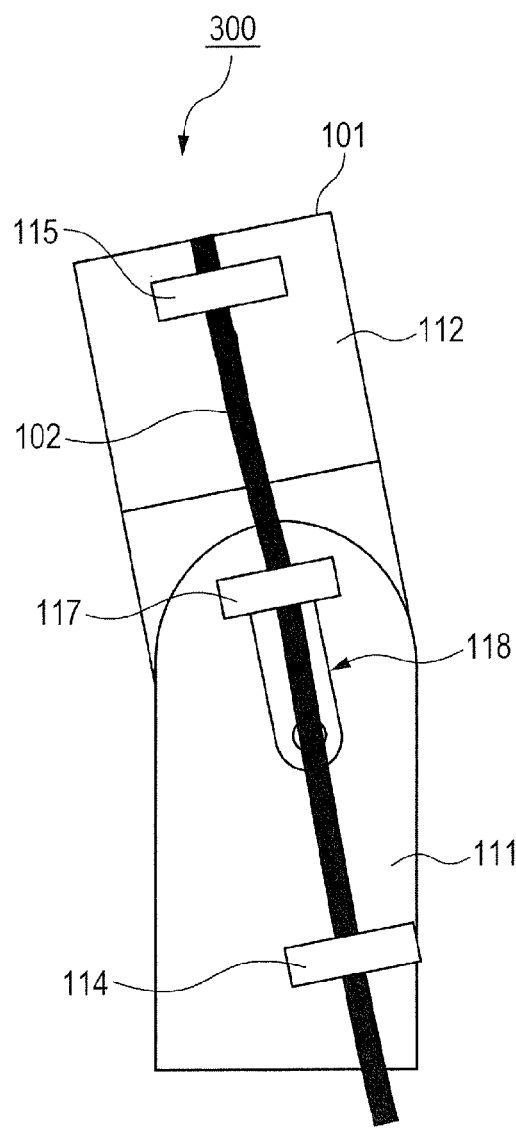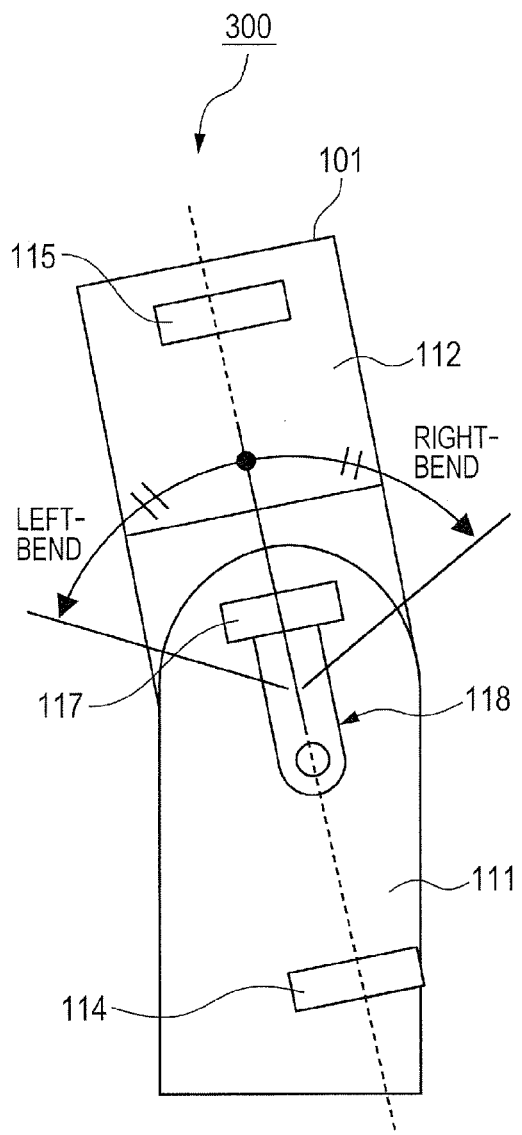

ROBOT

BACKGROUND OF THE INVENTION

1. Field of the Invention

The present invention relates to a robot that includes a robot arm including a first frame and a second frame that are coupled to each other so as to be turnable about a joint axis, and a cable fixed to the robot arm while being laid along a side surface of the robot arm.

2. Description of the Related Art

In a joint portion of an industrial robot, a cable such as a power line, a signal line, and air piping is provided. Along with the rotation of the joint portion, the cable receives bending and twisting forces to be deformed. At this time, the cable may sag to repeatedly collide with and slide on a peripheral device, and thus the cable may be damaged. In particular, when the cable is air piping, the cable may bend at a small curvature radius to fluctuate the air pressure, or air may leak outside from a flaw generated in the cable.

In the joint portion of the industrial robot, the cable is generally wired so that the cable can twist along with the rotation of the joint portion. However, in order to enable cable twisting, it is necessary to provide the cable three-dimensionally in a rotational axis direction, which leads to a problem in that the joint structure is upsized. In view of this, some industrial robots have a configuration in which the cable is laid along the outer side of the joint portion so that the cable may be bent to follow the rotation of the joint portion.

Further, there has been proposed a device in which, at both ends of the joint portion, that is, on the side surfaces of the first and second frames, the cable is supported by brackets each formed of a plate spring, to thereby enable displacement and inclination of the fixing position (see Japanese Patent Application Laid-Open No. H10-34588). This configuration prevents the cable from being damaged due to excessive tension of the cable, and prevents contact to a peripheral device due to flexure.

However, in Japanese Patent Application Laid-Open No. H10-34588, the brackets are elastically deformed, and hence the cable moving along with the rotation of the joint portion may not be fixed by the brackets, and the entire cable may move along with the elastic deformation of the brackets. When the entire cable moves as described above, a force may act on a connection portion such as a connector, resulting in disconnection of the cable at the connection portion.

Therefore, the cable needs to be fixed on the side surface of each frame. However, when the cable is laid along the side surface of each frame, the cable may be bent by the bending movement about the joint axis, which may cause flexure of the cable in the joint axis direction. When the cable flexes in the joint axis direction as described above, the cable may repeatedly collide with or slide on a peripheral device.

To address this problem, there is a measure of placing the robot at a location distanced from the peripheral device to prevent contact of the cable to the peripheral device, but there is a problem in that the placement space is increased. Further, the cable may be repeatedly brought into contact with the robot arm itself, and hence the damage on the cable cannot be prevented only by placing the robot at a location distanced from the peripheral device.

Therefore, the following measure is conceivable to prevent cable damage. The cable may be covered with an exterior cover such as Cableveyor (trademark) or bellows so that the cable is prevented from being brought into direct contact with the robot arm and the peripheral device.

However, more space is required to mount the exterior cover, and hence there is a problem in that the robot is upsized. Further, when the cable flexes inside the exterior cover, the cable is repeatedly brought into contact with the inner wall of the exterior cover, and hence the damage on the cable cannot be effectively prevented.

SUMMARY OF THE INVENTION

In view of this, the present invention has an object to provide a robot capable of regulating the flexure of a cable to prevent damage on the cable.

According to one embodiment of the present invention, there is provided a robot, including: a robot arm including: a first frame; and a second frame coupled to the first frame so as to be turnable about a joint axis; a cable arranged along a side surface of the first frame and a side surface of the second frame; a first fixing member for fixing the cable to the side surface of the first frame; a second fixing member for fixing the cable to the side surface of the second frame; a holding member for holding a part of the cable between the first fixing member and the second fixing member; and a support mechanism for regulating movement of the holding member in an axis direction of the joint axis, the support mechanism supporting the holding member so that the holding member is movable in a direction orthogonal to the axis direction of the joint axis to follow a bending movement of the cable.

Further features of the present invention will become apparent from the following description of exemplary embodiments with reference to the attached drawings.

BRIEF DESCRIPTION OF THE DRAWINGS

FIGS. 4A and 4B are schematic views illustrating the robot according to the first embodiment of the present invention.

FIGS. 6A and 6B are schematic views illustrating a robot according to a comparative example.

FIGS. 11A and 11B are schematic views illustrating a robot according to a third embodiment of the present invention.

DESCRIPTION OF THE EMBODIMENTS

Now, embodiments of the present invention are described in detail with reference to the drawings.

First Embodiment

Figure 1:
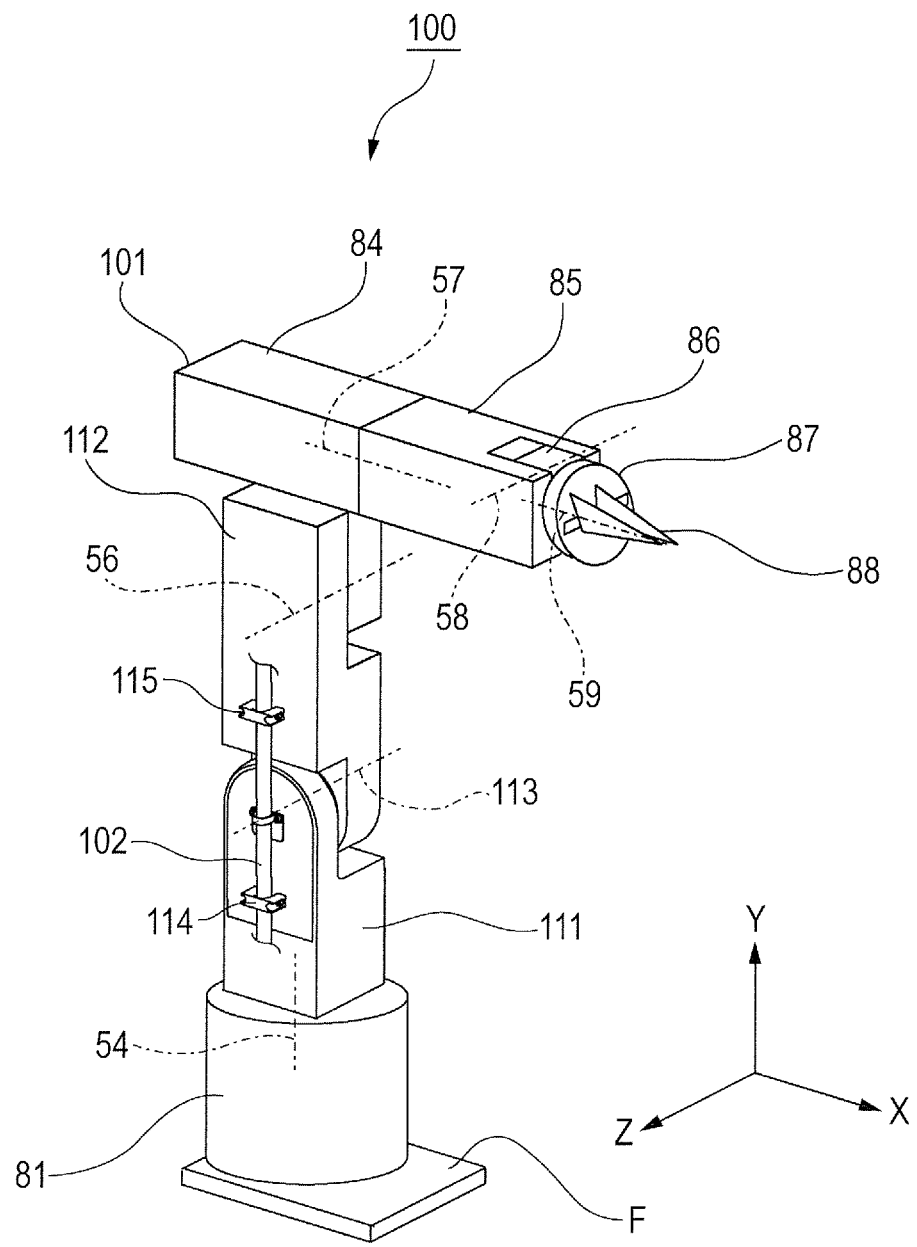
FIG. 1 is a perspective view illustrating a schematic configuration of a robot according to a first embodiment of the present invention.
Figure 2:
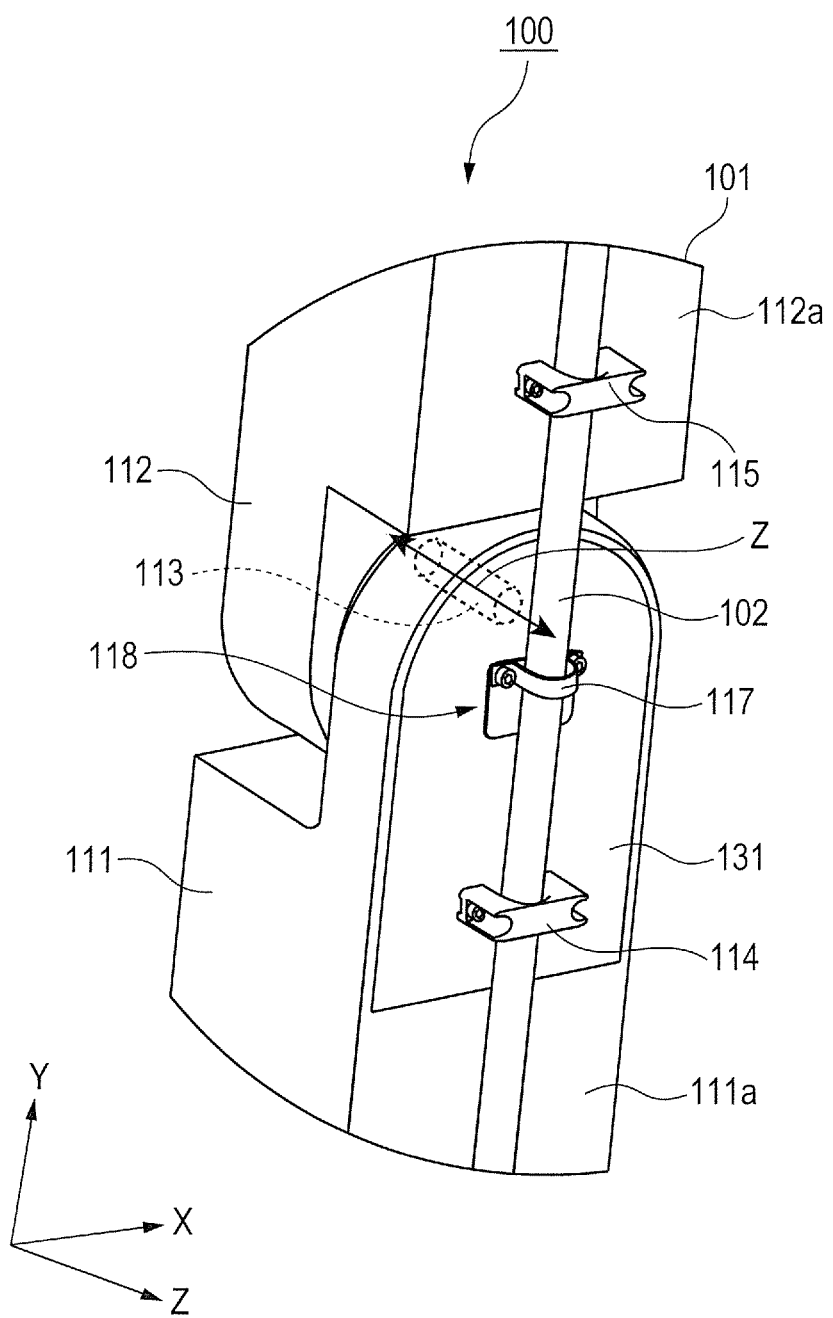
FIG. 2 is a partial perspective view illustrating the schematic configuration of the robot according to the first embodiment of the present invention.

FIG. 1 is a perspective view illustrating a schematic configuration of a robot according to a first embodiment of the present invention. Note that, in FIG. 1, the front-right direction of the drawing sheet is referred to as an X direction, the front-left direction of the drawing sheet is referred to as a Z direction, and an upward direction of the drawing sheet is referred to as a Y direction. Further, FIG. 2 is a partial perspective view illustrating the schematic configuration of the robot according to the first embodiment of the present invention. A robot 100 illustrated in FIG. 1 is an industrial robot, and includes a 6-axis robot arm 101, an end effector (for example, robot hand) 88 provided on a distal end of the robot arm 101, and a cable 102 laid along the outer side surface of the robot arm 101.

The robot arm 101 includes a frame 111 serving as a first frame (first link) formed of a longitudinal member, and a frame 112 serving as a second frame (second link) formed of a longitudinal member. The distal end of the frame 111 and the proximal end of the frame 112 are coupled to each other at a joint axis (joint shaft) 113. With this, the frame 112 can turn about the joint axis 113 with respect to the frame 111. The frame 112 performs a turning motion in a range of ±90° with respect to the frame 111 about the joint axis 113 by a motor (not shown) provided inside the frame 112.

The robot arm 101 further includes a base 81 that is fixed to a floor surface F and serves as a base part for supporting the proximal end of the frame 111. Inside the base 81, a motor (not shown) is provided to cause the frame 111 to perform rotating movement in a range of ±180° about a joint axis 54.

The robot arm 101 further includes a frame 84 coupled to the frame 112 so as to be turnable about a joint axis 56, and a frame 85 coupled to the frame 84 so as to be rotatable about a joint axis 57. The robot arm 101 further includes a frame 86 coupled to the frame 85 so as to be turnable about a joint axis 58, and a frame 87 coupled to the frame 86 so as to be rotatable about a joint axis 59.

The frame 84 performs a turning motion in a range of ±90° about the joint axis 56 by a motor (not shown) provided inside the frame 112. The frame 85 performs a rotating motion in a range of ±180° about the joint axis 57 by a motor (not shown) provided inside the frame 84. The frame 86 performs a turning motion in a range of ±90° about the joint axis 58 by a motor (not shown) provided inside the frame 85. The frame 87 performs a rotating motion in a range of ±180° about the joint axis 59 by a motor (not shown) provided inside the frame 86. The end effector 88 is mounted to the frame 87 and is driven by a motor (not shown) provided inside the end effector 88 to enable grasping or releasing of an object (not shown).

The robot arm 101 is configured so that the frames 111, 112, 84, 85, 86, and 87 each perform the turning motion or the rotating motion, and hence as compared to a configuration in which a linear motion is performed, a space to be occupied by the robot arm 101 can be reduced. Further, the frames 111, 112, 84, 85, 86, and can perform the motion independently, and hence the distal end of the robot arm 101 can take a posture with six degrees of freedom.

The respective motors for driving the frame 111, the frame 112, the frame 84, the frame 85, the frame 86, the frame 87, and the end effector 88 are supplied with power and control signals via cables. The cable is connected to the base 81 from a control device (not shown) provided outside the robot arm 101, and passes through each frame to be connected to each motor. For example, when the cable 102 is connected to the motor provided inside the frame 112, the cable 102 connected to the base 81 passes inside the frame 111 and is led outside. The cable 102 led outside is wired along the side surface of the frame 111 toward the frame 112. Then, the cable 102 is drawn inside the frame 112 to be connected to the motor (not shown) provided inside the frame 112.

As illustrated in FIG. 2, the frame 111 has a side surface 111a, and the frame 112 has a side surface 112a. The side surface 111a and the side surface 112a are flush with each other. The side surface 111a is a surface on the outer side of the frame 111, and the side surface 112a is a surface on the outer side of the frame 112. The side surface 111a is a surface whose normal is parallel to the axis of the joint shaft 113, and the side surface 112a is a surface whose normal is parallel to the axis of the joint shaft 113. In other words, the side surfaces 111a and 112a are surfaces perpendicular to the joint shaft 113.

Note that, the side surface 111a and the side surface 112a may not be flush but shifted from each other, and the side surfaces 111a and 112a may not be surfaces perpendicular to the joint shaft 113 but surfaces shifted from the perpendicular state.

The cable 102 is arranged along the side surface 111a and the side surface 112a so as to extend in the longitudinal direction. The cable 102 is a power line, a signal line, air piping, or a combination thereof, and both ends thereof are connected to a control device, a motor, etc. (not shown) via connection portions such as connectors.

In the first embodiment, the robot 100 includes a holding member 117 for holding the cable 102, and a support mechanism 118 for supporting the holding member 117. The support mechanism 118 regulates the movement of the holding member 117 in the axis direction of the joint shaft 113 (Z direction). Further, the support mechanism 118 supports the holding member 117 in a manner that the holding member 117 is movable in directions (X and Y directions) orthogonal to the axis direction of the joint shaft 113 to follow the bending movement of the cable 102.

A panel 131 is removably mounted onto the side surface 111a of the frame 111, and the support mechanism 118 is fixed to the side surface 111a through intermediation of the panel 131. In the first embodiment, the support mechanism 118 is mounted to the panel 131. A fixing member 114 serving as a first fixing member and the support mechanism 118 are removably mounted onto the panel 131, and the fixing member 114 and the support mechanism 118 can be easily changed depending on the diameter and rigidity of the cable 102.

The cable 102 is fixed to the side surface 111a of the frame 111 by the fixing member 114 serving as the first fixing member through intermediation of the panel 131, and is fixed to the side surface 112a of the frame 112 by a fixing member 115 serving as a second fixing member. Specifically, a part of the cable 102 is sandwiched between the fixing member 114 and the side surface 111a of the frame 111 (panel 131) to be fixed to the side surface 111a. Further, another part of the cable 102 is sandwiched between the fixing member 115 and the side surface 112a of the frame 112 to be fixed to the side surface 112a. In the first embodiment, the cable 102 is fixed to the robot arm 101 by the fixing members 114 and 115 so that the entire cable 102 is prevented from moving due to the bending movement of the robot arm 101 (turning movement of the frame 112 with respect to the frame 111). Therefore, a tension force may be prevented from acting on the connection portion between the cable 102 and the control device, the motor, or the like, and the cable 102 may be prevented from disconnecting from the control device, the motor, or the like at the connection portion.

At this time, the cable 102 is fixed so that, when the robot arm 101 takes a predetermined posture, a part of the cable 102 between a part fixed to the fixing member 114 and a part fixed to the fixing member 115 is linear. In the first embodiment, the predetermined posture refers to a reference posture in which the longitudinal axis of the frame 111 and the longitudinal axis of the frame 112 become parallel to each other.

Figure 3A:
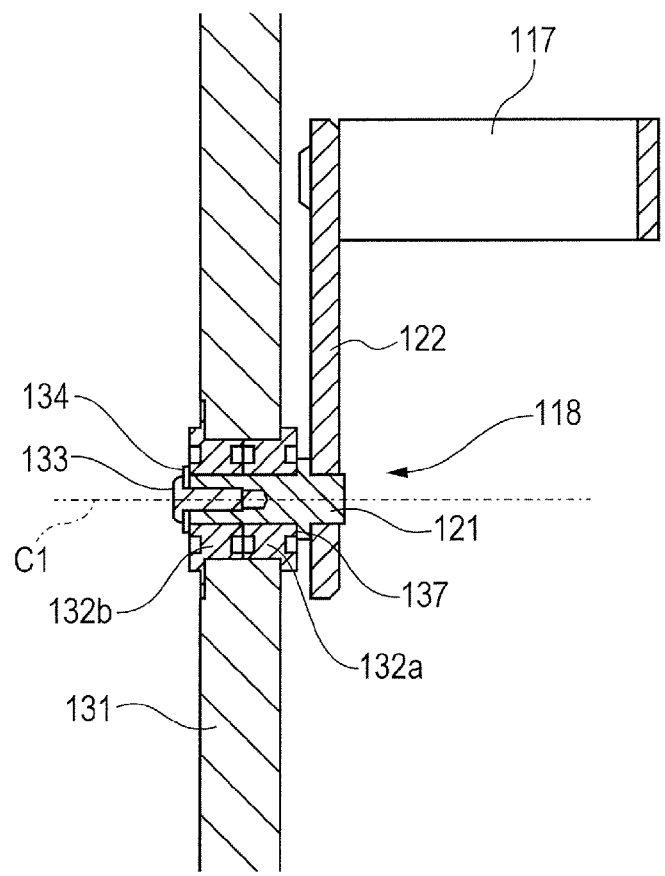
FIGS. 3A and 3B are explanatory views illustrating schematic configurations of a holding member and a support mechanism in the first embodiment of the present invention.
Figure 3B:
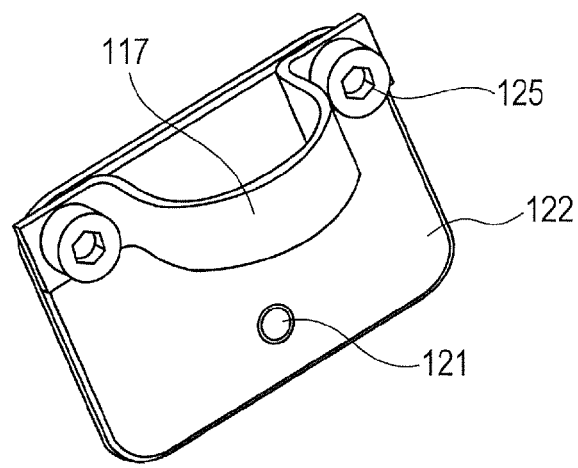

FIGS. 3A and 3B are explanatory views illustrating the schematic configurations of the holding member and the support mechanism in the first embodiment of the present invention. FIG. 3A is a sectional view of the holding member and the support mechanism, and FIG. 3B is a perspective view of the holding member and the support mechanism.

The support mechanism 118 includes a rotating shaft 121 provided in parallel to the joint shaft 113, and a rocking plate 122 serving as a rocking member that is fixed to the rotating shaft 121 to be supported by the side surface 111a of the frame 111 so as to be rockable about an axis C1 of the rotating shaft 121. The rocking plate 122 is supported by the rotating shaft 121 at an interval with respect to the panel 131 (side surface 111a) so as to prevent contact to the panel 131 (side surface 111a). The rocking plate 122 is formed of a rigid body, and is not deformed by the flexure force of the cable 102. Even when the rocking plate 122 is deformed, the rocking plate 122 is deformed to the extent of avoiding contact to the panel 131 (side surface 111a). With this, even when the cable 102 is bent, the rocking plate 122 is not brought into contact with the panel 131 (side surface 111a).

The holding member 117 is fixed to the rocking plate 122 at a position near the axis of the joint shaft 113 with respect to the axis C1 with bolts 125 serving as a fastener. Thus, a part of the cable 102 between the fixing member 114 and the fixing member 115 is held by being sandwiched between the holding member 117 and the rocking plate 122. A large flexure force is generated at a part of the cable 102 near the joint shaft 113. Therefore, this part is held by the holding member 117, to thereby effectively prevent the flexure of the cable 102.

In the panel 131 fixed to the frame 111, a stepped hole is formed. As illustrated in FIG. 3A, a first rolling bearing 132a and a second rolling bearing 132b that are opposed to each other are fitted into the panel 131 at an appropriate tolerance.

The rotating shaft 121 is inserted through the rolling bearings 132a and 132b, and one end of the rotating shaft 121 is integrated with the rocking plate 122 through caulking. The other end of the rotating shaft 121 is fixed to inner races of the rolling bearings 132a and 132b with a bolt 133 and a washer 134 so that the rotating shaft 121 does not slip out from the rolling bearings 132a and 132b.

Further, a spring washer 137 is sandwiched between a stepped portion of the rotating shaft 121 and the inner race of the rolling bearing 132a, to thereby adjust the pre-load of the rolling bearings 132a and 132b. The holding member 117 is removably mounted to the rocking plate 122 with the bolts 125.

In the first embodiment, the rolling bearings 132a and 132b are exemplified as a mechanism for rotating the rotating shaft 121, but sliding bearings may also be employed.

Further, in the first embodiment, the rocking plate 122 and the rotating shaft 121 are integrally fixed to each other, and the rotating shaft 121 is rotated with respect to the side surface 111a (panel 131) so that the rocking plate 122 swings about the axis C1. However, the present invention is not limited thereto. Instead of the rotating shaft 121, a fixed shaft fixed to the side surface 111a (panel 131) may be used. The rocking plate 122 may be supported by the fixed shaft through intermediation of a bearing, and the rocking plate 122 may swing about the axis of the fixed shaft.

FIGS. 4A and 4B are schematic views illustrating the robot according to the first embodiment of the present invention. FIG. 4A is a schematic front view of the robot, and FIG. 4B is a schematic side view of the robot. The cable 102 is fixed to the rocking plate 122 by the holding member 117 in the vicinity of the joint shaft 113. The reference posture refers to a state in which, as illustrated in FIGS. 4A and 4B, the frame 111 and the frame 112 are arrayed straightly to each other in the longitudinal direction.

Figure 5:
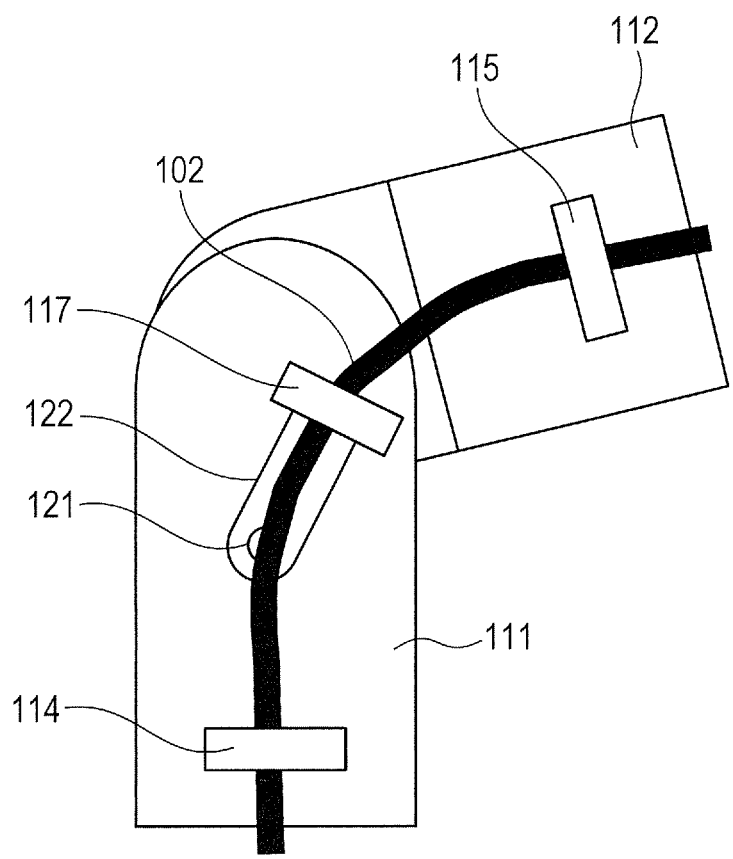
FIG. 5 is a schematic view illustrating the robot according to the first embodiment of the present invention.

FIG. 5 is a schematic view illustrating the robot according to the first embodiment of the present invention, and illustrates a state in which the robot arm 101 is bent, that is, a state in which the frame 112 is turned with respect to the frame 111. As illustrated in FIG. 5, the rocking plate 122 is passively swung about the rotating shaft 121 so as to follow the bending movement of the cable 102. With this, the position and the posture of the holding member 117 are passively changed in the X and Y directions orthogonal to the axis direction of the joint shaft 113 (Z direction) about the axis C1. At this time, the movement of the holding member 117 in the Z direction is regulated because the rocking plate 122 is fixed to the rotating shaft 121, and further, the rocking plate 122 is formed of a rigid body.

As described above, the movement of the holding member 117 in the Z direction is regulated by the support mechanism 118, and hence the flexure of the cable 102 held by the holding member 117 is regulated in the Z direction. Particularly in the first embodiment, the holding member 117 holds the cable 102 by pushing the cable 102 against the surface of the rocking plate 122, and hence the flexure of the cable 102 is effectively regulated by the surface of the rocking plate 122.

Further, the holding member 117 is supported by the support mechanism 118 so as to be movable in the X and Y directions orthogonal to the axis direction of the joint shaft 113 to follow the bending movement of the cable 102. With this, the movement of the part of the cable 102 between the fixing member 114 and the fixing member 115 is not inhibited in the X and Y directions. Therefore, a force is prevented from locally concentrating onto the cable 102, and the cable 102 is prevented from being damaged. Further, the cable 102 does not need to be covered with an exterior cover such as Cableveyor (trademark) or bellows, and hence the mounting space for the cable 102 can be reduced. Thus, the robot 100 can be downsized.

Figure 7A:
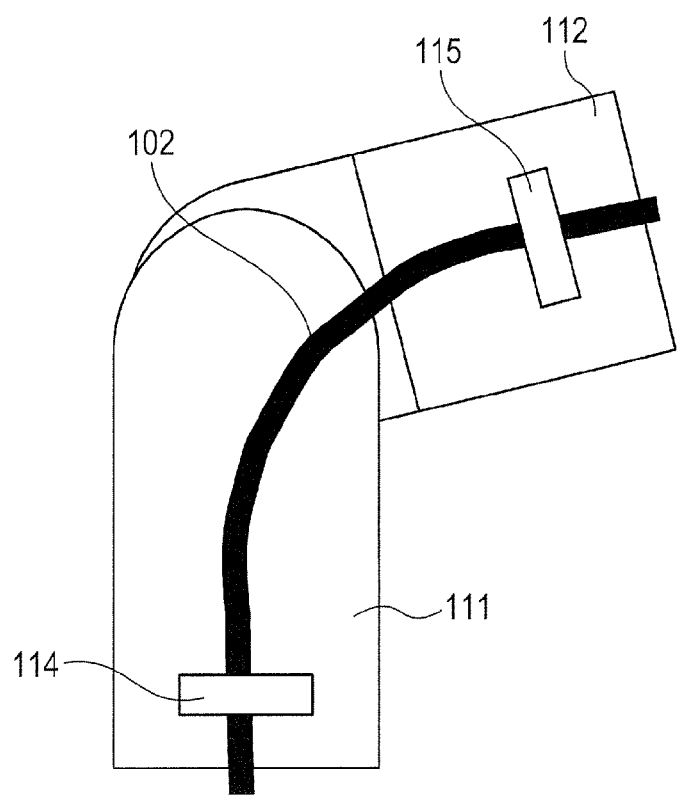
FIGS. 7A and 7B are schematic views illustrating the robot according to the comparative example.
Figure 7B:
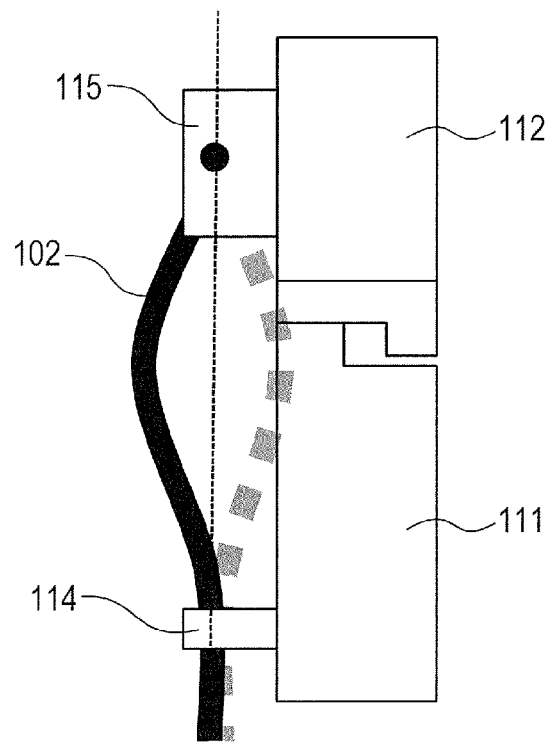

Next, a comparative example in which the holding member 117 and the support mechanism 118 that are features of the first embodiment of the present invention are omitted is described. FIGS. 6A, 6B, 7A, and 7B are schematic views illustrating a robot according to the comparative example. FIGS. 6A and 6B illustrate a state in which the robot arm is unbent, and FIGS. 7A and 7B illustrate a state in which the robot arm is bent at the joint. FIG. 6A is a schematic front view of the robot, and FIG. 6B is a schematic side view of the robot. FIG. 7A is a schematic front view of the robot, and FIG. 7B is a schematic side view of the robot.

Similarly to FIGS. 4A and 4B, the reference posture refers to a case where, as illustrated in FIGS. 6A and 6B, the frame 111 and the frame 112 are arrayed straightly in the longitudinal direction. Further, as illustrated in FIGS. 7A and 7B, a state in which the frame 112 is rotated up to a movable range limit of the joint shaft 113 with respect to the frame 111 is referred to as a limit bend, and the posture at this time is referred to as a limit bend posture.

In a case where both ends of the cable 102 are fixed with an appropriate tension in the reference posture state so that the cable 102 does not sag, when the joint shaft 113 is rotated, the cable 102 is bent to cause flexure. At this time, as illustrated in FIG. 7B, the cable 102 flexes with respect to the height at which the fixing member 114 and the fixing member 115 respectively fix the cable 102. Further, in a case where both the ends of the cable 102 are fixed with an appropriate tension in the bending posture so that the cable 102 does not sag, the cable 102 flexes when the joint shaft 113 rotates to return to the reference posture.

Figure 8:
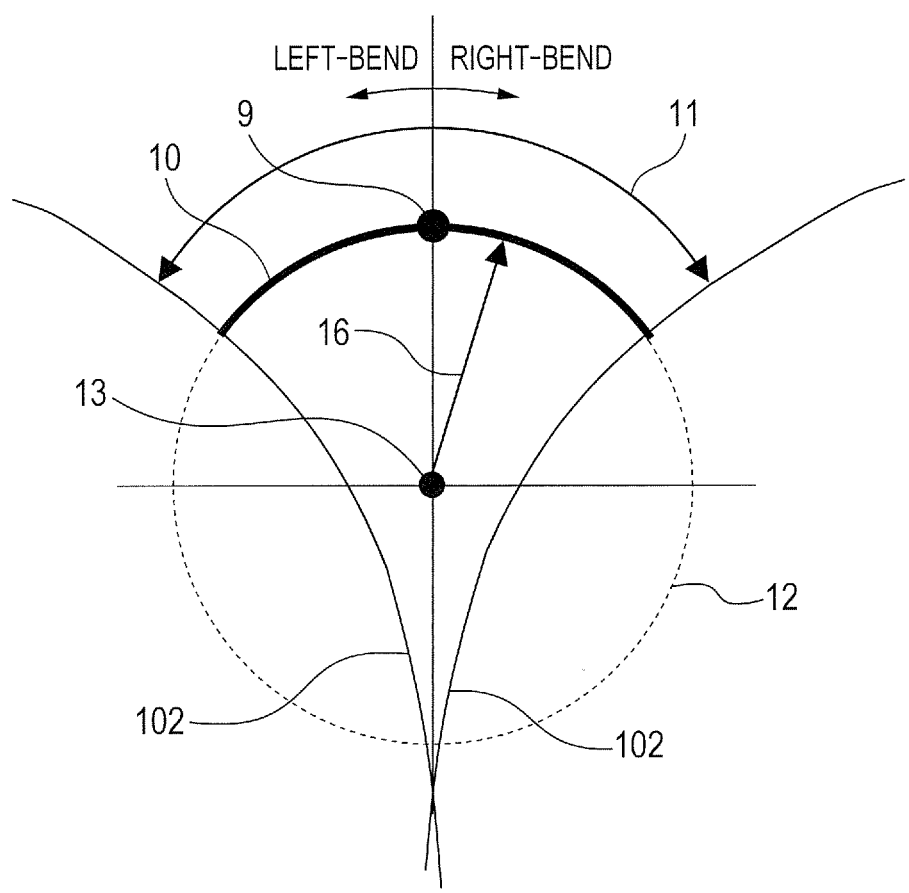
FIG. 8 is an explanatory view illustrating a trajectory of a point on a cable and an approximate circle of the trajectory according to the first embodiment of the present invention.

Next, the positional relationship between the holding member 117 and the rotating shaft 121 is described with reference to FIGS. 8 and 9. As illustrated in FIG. 8, a point on the cable 102, which passes near the joint shaft 113 in the reference posture, is referred to as a cable holding position point 9. The cable holding position point 9 refers to a position at which the cable 102 is held by the holding member 117. The flexure of the cable 102 is most liable to occur near the joint shaft 113, and hence in order to effectively prevent the flexure, the cable holding position point 9 is set near the joint shaft 113.

Further, the cable holding position point 9 moves along with the rotation of the joint shaft 113. This moving range is referred to as a cable holding position point moving range 11. With the cable holding position point 9 in the reference posture as a branch point, the right side corresponds to a right-bend, and the left side corresponds to a left-bend.

When the cable 102 is bent on right and left sides within a turnable range of the frame 112 with respect to the frame 111 about the joint shaft 113, the trajectory to be drawn by the cable holding position point 9 is referred to as a cable holding position trajectory 10. Next, an approximate circle 12 of the cable holding position trajectory 10 is created. As a method of creating the approximate circle 12, the least squares method may be adopted to the cable holding position trajectory 10 to draw the circle, but the method for creating the approximate circle 12 is arbitrary.

The rotating shaft 121 is placed at a center point 13 of the approximate circle 12, and the holding member 117 for holding the cable 102 is placed on the approximate circle 12. The holding member 117 may be passively rotated (revolved) about the rotating shaft 121. For example, when the frame 112 turns with respect to the frame 111 to bend the cable 102 on the right and left sides, the holding member 117 receives the bending force of the cable 102 to rotate (revolve) about the rotating shaft 121 to follow the bending movement of the cable 102.

In the first embodiment, the reference posture of the robot arm 101 refers to a posture in which the frame 112 is located at the center of the turnable range of the frame 112 with respect to the frame 111. Under this state, the fixing members 114 and 115 are arranged so that the part of the cable 102 between the fixing member 114 and the fixing member 115 is linear. With this, the minimum value of the curvature radius of the cable 102 is increased, and the life of the cable 102 is extended.

Figure 9:
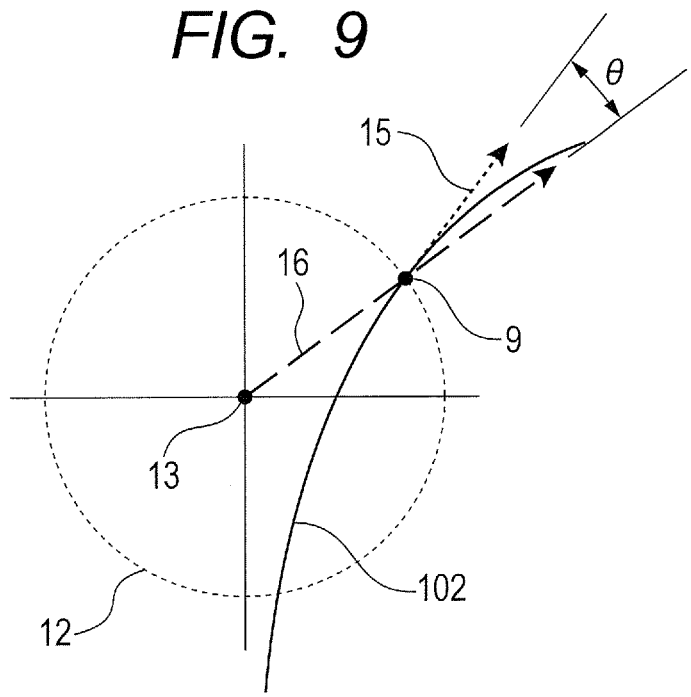
FIG. 9 is an explanatory view illustrating the orientation of the cable and the orientation of the holding member according to the first embodiment of the present invention.

As illustrated in FIG. 9, a tangential direction of the cable 102 at the cable holding position point 9 when the joint shaft 113 is rotated to the movable range limit is referred to as a longitudinal direction 15 of the cable 102. A direction connecting the cable holding position point 9 and the center point 13 at the cable holding position point 9 is referred to as a swing retaining direction 16.

The symbol $\theta$ in FIG. 9 indicates an angle formed between the longitudinal direction 15 of the cable 102 and the swing retaining direction 16, and corresponds to a cable fixing portion deforming angle. The cable fixing portion deforming angle is set to an angle that prevents damage on the cable 102 even when bending is repeated the predetermined number of times. The predetermined number of times is set depending on the life of the robot 100 of the first embodiment.

When the cable fixing portion deforming angle $\theta$ is not equal to or smaller than a predetermined value, the cable holding position point 9 is slightly shifted, and a position of the rotating shaft 121 is obtained by the above-mentioned method. It is determined whether or not the cable fixing portion deforming angle is equal to or smaller than the predetermined value, and when the cable fixing portion deforming angle is larger than the predetermined value, the cable holding position point 9 is shifted again. The position of the holding member 117 is determined so that the cable fixing portion deforming angle is equal to or smaller than the predetermined value. Further, when the cable fixing portion deforming angle does not become equal to or smaller than the predetermined value, the joint movable range is limited so that the cable fixing portion deforming angle becomes equal to or smaller than the predetermined value. The joint movable range is limited by limiting the movement of the industrial robot mechanically or by means of software.

As described above, in the first embodiment, the cable 102 is provided with the fixing member 114, the fixing member 115, and the holding member 117, and the holding member 117 is supported by the support mechanism 118. In this manner, the flexure of the cable 102 can be prevented in the Z direction of FIG. 4A. With this, the width is not enlarged to the outer side of the frames 111 and 112 due to the flexure of the cable 102. Further, the friction of the cable 102 to the side surfaces 111a and 112a is eliminated, and thus the cable 102 may have a longer life.

Second Embodiment

Figure 10:
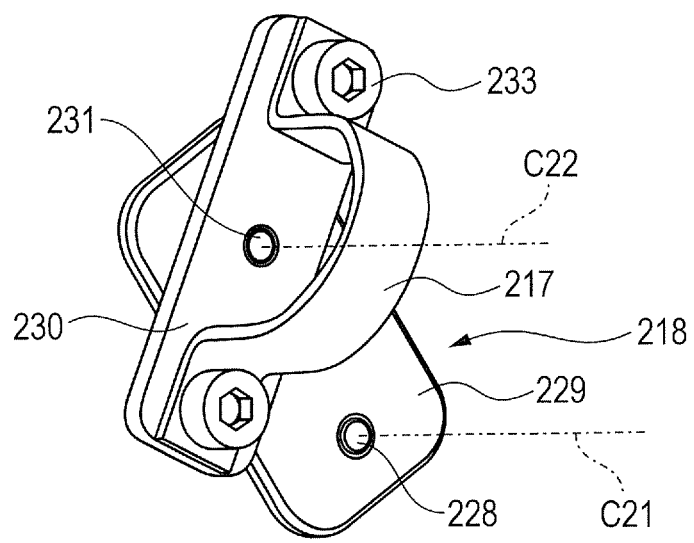
FIG. 10 is a perspective view of a holding member and a support mechanism of a robot according to a second embodiment of the present invention.

Next, a robot according to a second embodiment of the present invention is described. FIG. 10 is a perspective view illustrating a holding member and a support mechanism of the robot according to the second embodiment of the present invention. Note that, the configuration of the robot arm is similar to that in the first embodiment, and hence the robot arm is described with reference to FIG. 1.

In FIG. 10, a support mechanism 218 includes a rocking plate 229 serving as a first rocking member supported by the side surface 111a (FIG. 1) of the frame 111 serving as the first frame so as to be rockable about an axis C21 serving as a first axis of a rotating shaft 228 provided in parallel to the joint shaft 113 (FIG. 1). The support mechanism 218 further includes a rocking plate 230 serving as a second rocking member supported by the rocking plate 229 so as to be rockable about an axis C22 of a rotating shaft 231 as a second axis provided differently from the axis C21 and in parallel to the joint shaft 113. In other words, the axis C21 and the axis C22 do not intersect each other but are parallel to each other. A holding member 217 is fixed to the rocking plate 230 by a bolt 233.

The rocking plate 229 is formed of a rigid body, and is not deformed by the flexure force of the cable. Even when the rocking plate 229 is deformed, the rocking plate 229 is deformed to the extent of avoiding contact to the side surface 111a (panel 131). With this, even when the cable is bent, the rocking plate 229 is not brought into contact with the side surface 111a (panel 131).

In the second embodiment, the center of the rocking plate 230 is fixed to the rotating shaft 231, and the rocking plate 230 is supported rotatably about the rotating shaft 231. The rocking plate 230 can passively change its posture with respect to the rocking plate 229 by the bending movement of the cable following the bending movement of the robot arm 101.

In other words, in the second embodiment, in order to increase the joint movable angle, as illustrated in FIG. 10, the rotating shaft 228 and the rotating shaft 231 are provided for the holding member 217. In this case, similarly to the first embodiment, the bearing structure is adopted as the support structure for the rotating shafts 228 and 231. Further, the rocking plate 229 is fixed to the rotating shaft 228, and the rocking plate 230 is fixed to the rotating shaft 231. Note that, when the fixed shaft is adopted instead of the rotating shafts 228 and 231, each of the rocking plates 229 and 230 may be supported rockably with respect to the fixed shaft through intermediation of a bearing.

As described above, the rocking plate 230 is rotated about the axis C22, and hence the swing retaining direction 16 and the longitudinal direction 15 of the cable substantially match with each other. In this manner, a force is not locally applied to the cable.

In the first embodiment, the cable fixing portion deforming angle may limit the joint movable angle. In other words, when such wiring that the cable fixing portion deforming angle becomes equal to or smaller than a predetermined value is impossible, the joint movable angle needs to be decreased. In the second embodiment, as compared to the first embodiment, the joint movable angle can be increased, and the cable fixing portion deforming angle can be maintained small.

Further, the rocking plate 230 is rockably supported by the rocking plate 229 at a position near the joint shaft 113 (FIG. 1) with respect to the axis C1, and hence the joint movable angle can be further effectively increased.

Third Embodiment

Next, a robot according to a third embodiment of the present invention is described. In the first embodiment, the state in which the longitudinal axis of the frame 112 is provided in parallel to that of the frame 111 is referred to as the reference posture, and the case where turning is performed symmetrically from the reference posture is described. However, in a general industrial robot, from the reason of the movable region of the robot arm 101, there are many cases where the frame 112 does not move symmetrically with respect to the reference posture about the joint. In the third embodiment, the case where the frame 112 does not move symmetrically about the joint is described.

FIGS. 11A and 11B are schematic views illustrating a robot 300 according to the third embodiment of the present invention. In this robot arm 101, when the frame 112 turns on the right and left sides from the reference state in which the longitudinal axis of the frame 111 and the longitudinal axis of the frame 112 match with each other, the turnable and movable range may differ on each side. At this time, the turning angle is larger on one of right and left sides than the other side.

The fixing member 114 and the fixing member 115 are arranged so that, under a state in which the robot arm 101 takes a predetermined posture, a part of the cable 102 between the fixing member 114 and the fixing member 115 becomes linear. In the third embodiment, the predetermined posture of the robot arm 101 corresponds to such a posture that the frame 112 is located at the center of the turnable range of the frame 112 with respect to the frame 111.

In other words, as illustrated in FIGS. 11A and 11B, the fixing member 114, the fixing member 115, and the holding member 117 are arranged so as to be located on a straight line so that the cable 102 becomes linear (straight) at a center position in the turnable range of the frame 112 with respect to the frame 111. With this arrangement, rotation is performed by the same angle on both the right and left sides, and hence such a force that the cable 102 receives from the holding member 117 from does not increase only on one side of the movable range. The fixing member 114 and the fixing member 115 are provided so that the cable 102 becomes straight at the center of the turnable range as described above, and thus the joint movable range can be increased.

Further, in order to downsize the robot 300 and to prevent the holding member 117 itself and a peripheral device from being damaged due to the collision and sliding of the holding member 117 against the peripheral device, the holding member 117 is preferred to move within a range smaller than the widths of the frames 111 and 112. Therefore, when the approximate circle 12 is created, in a case where the cable holding position trajectory 10 is larger than the widths of the frames 111 and 112, the cable holding position point 9 is slightly shifted toward the longitudinal direction 15 of the cable and the approximate circle is drawn again. The condition at which the cable holding position trajectory 10 becomes smaller than the widths of the frames 111 and 112 is determined to determine the holding position and the rotational center position of the holding member 117. As described above, the holding member 117 is moved in a range smaller than the width of the frame 111 or 112, and thus the robot 300 may be downsized.

Fourth Embodiment

Figure 12:
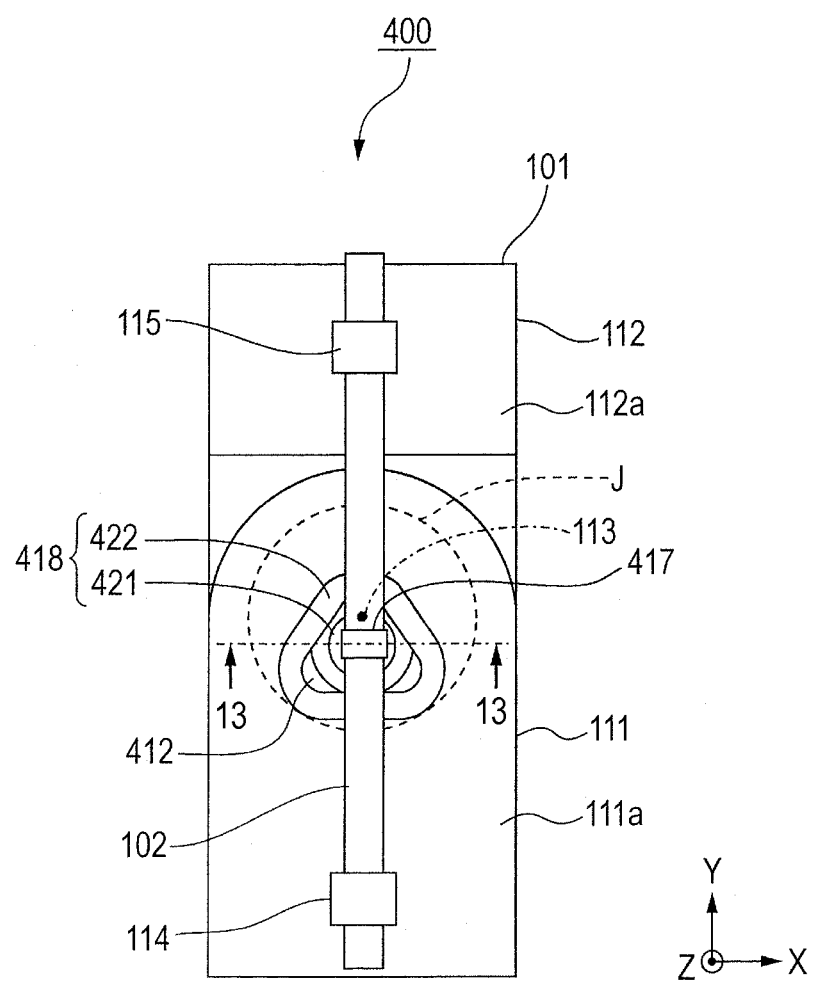
FIG. 12 is a schematic view illustrating a robot according to a fourth embodiment of the present invention.
Figure 13:
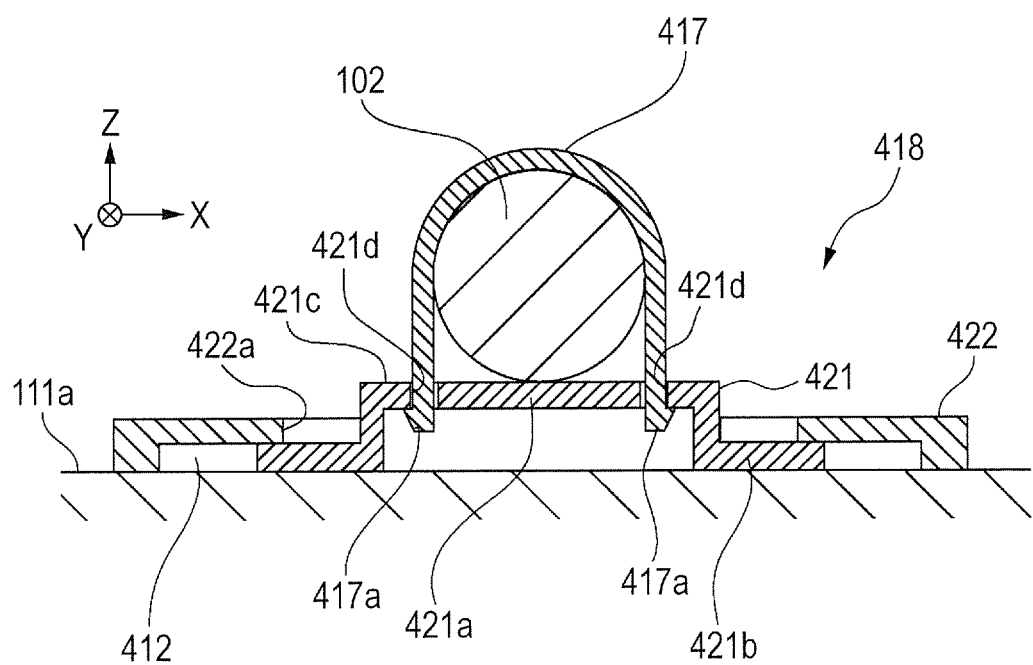
FIG. 13 is a partial sectional view of the robot taken along the line 13-13 of FIG. 12.

Next, a robot according to a fourth embodiment of the present invention is described. FIG. 12 is a schematic view illustrating the robot according to the fourth embodiment of the present invention. FIG. 13 is a partial sectional view of the robot taken along the line 13-13 of FIG. 12. Note that, the components similar to those of the first embodiment are denoted by the same reference symbols, and description thereof is omitted.

A robot 400 includes the robot arm 101 and the cable 102 that are similar to those of the first embodiment. The frame 111 and the frame 112 of the robot arm 101 are coupled to each other via a joint portion J. Similarly to the first embodiment, the cable 102 is arranged along the side surface 111a of the frame 111 and the side surface 112a of the frame 112, and passes near the joint portion J. The frame 111 side of the cable 102 is fixed to the side surface 111a of the frame 111 by the fixing member 114, and further, the frame 112 side of the cable 102 is fixed to the side surface 112a of the frame 112 by the fixing member 115.

The robot 400 includes a cable fixing member 417 serving as the holding member for holding the part of the cable 102 between the fixing member 114 and the fixing member 115. Further, the robot 400 includes a support mechanism 418 for regulating the movement of the cable fixing member 417 in the axis direction of the joint shaft 113 (Z direction), and supporting the cable fixing member 417 in a manner that the cable fixing member 417 is movable in the X and Y directions orthogonal to the Z direction.

The support mechanism 418 includes a movable body 421 and a support member 422. The movable body 421 includes a fixing portion 421a for a cable and a flange portion 421b. The fixing portion 421a for a cable has a fixing surface 421c for a cable, to which the cable 102 is fixed by the cable fixing member 417. The flange portion 421b protrudes from the fixing portion 421a for a cable in directions (X and Y directions) orthogonal to the axis direction (Z direction), and is formed so as to be brought into surface contact with a side surface of one of the frames 111 and 112, for example, the side surface 111a of the frame 111.

The cable 102 is fixed to the fixing surface 421c for a cable of the fixing portion 421a for a cable of the movable body 421 by the cable fixing member 417, and the cable 102 and the movable body 421 are integrally moved. In the fixing surface 421c for a cable, which serves as a cable mounting surface of the movable body 421, two through holes 421d are opened at an interval smaller than the diameter of the cable 102. Further, both end portions 417a of the cable fixing member 417 are each formed into a claw shape. Both the claw-shaped end portions 417a of the cable fixing member 417 are inserted through the through holes 421d, respectively. Thus, both the claw-shaped end portions 417a are pushed outwardly by the cable 102, and both the claw-shaped end portions 417a are hooked to the edge parts of the through holes 421d, respectively. With this, the cable 102 is fixed to the fixing surface 421c for a cable.

Therefore, when the cable 102 is fixed by the cable fixing member 417, there is no need to provide parts for fixing, such as a bolt, and the number of components can be reduced.

The support member 422 supports the flange portion 421b by sandwiching the flange portion 421b between the support member 422 and the side surface 111a of the frame 111. The support member 422 is fixed to the side surface 111a with a gap 412 provided between the support member 422 and the flange portion 421b, for allowing the movable body 421 to move along the side surface 111a of the frame 111. Further, the support member 422 has an opening portion 422a formed therein, for avoiding interference with the fixing portion 421a for a cable. The fixing portion 421a for a cable protrudes outside through the opening portion 422a from a region surrounded by the support member 422 and the side surface 111a. As described above, the flange portion 421b of the movable body 421 is supported inside the gap 412 provided between the support member 422 and the side surface 111a of the frame 111.

Figure 14:
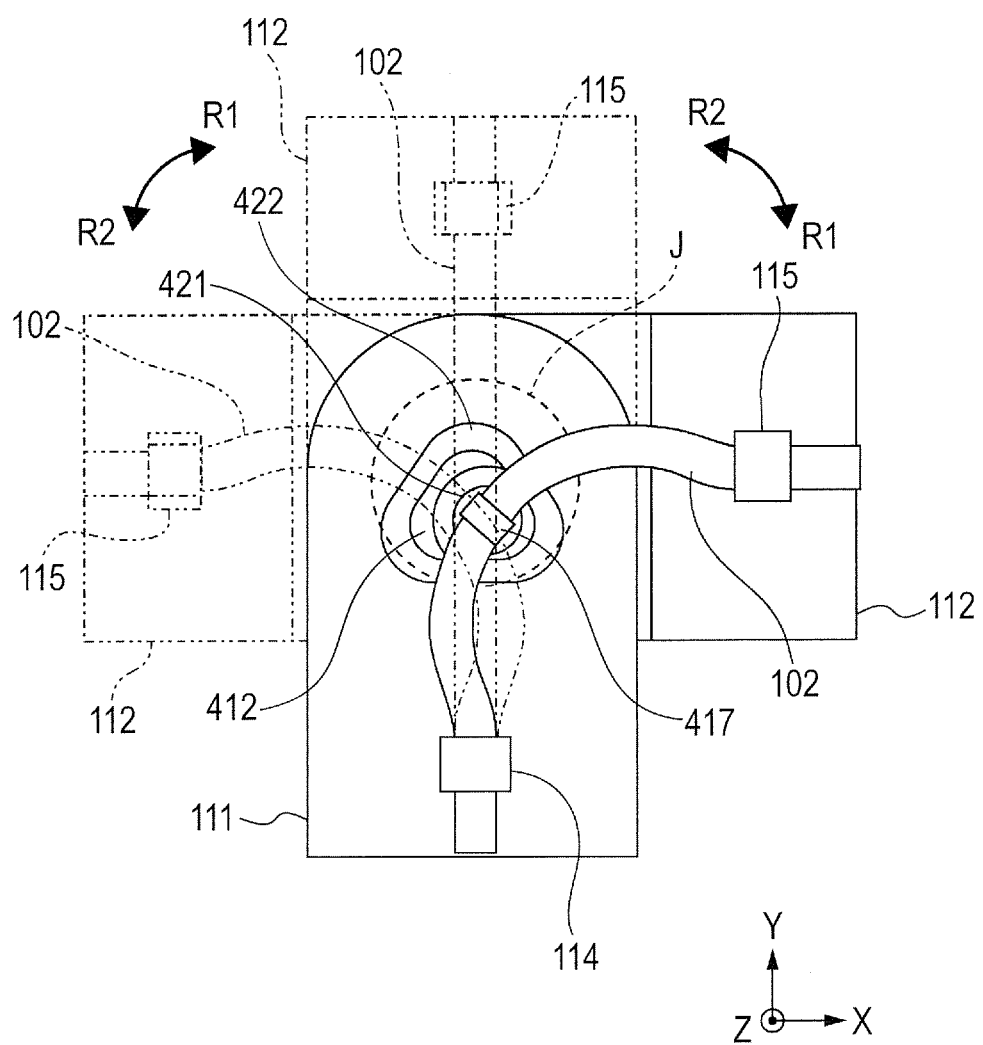
FIG. 14 is a schematic view when a second frame of a robot arm is moved to turn with respect to a first frame.

FIG. 14 is a schematic view illustrating a state when the frame 112 of the robot arm 101 performs turning movement with respect to the frame 111. The movable body 421 can move in the X and Y directions inside the gap 412, and can rotate about the Z direction (directions indicated by arrows R1 and R2). Further, the movement of the movable body 421 in the Z direction and the rotation thereof about the X and Y directions are regulated. With this, the cable 102 that moves integrally with the movable body 421 can similarly move in the X and Y directions, and can similarly rotate about the Z direction. Further, the movement of the cable 102 in the Z direction, and the rotation thereof about the X and Y directions are regulated.

Further, a fluorine resin material is used for the movable body 421 so as to enable smooth movement inside the gap 412, and it is preferred to apply grease for lubrication on the surface thereof. Note that, the fixing portion 421a for a cable of the movable body 421 is exposed to the outside from the opening portion 422a of the support member 422, and the cable 102 is fixed to the exposed part of the fixing surface 421c for a cable.

As illustrated in FIG. 14, when the frame 112 turns by +90° or −90° with respect to the frame 111 about the joint portion J, the cable 102 deforms in accordance with the movement of the frame 112. At this time, the movable body 421 moves together with the cable 102, but the movable body 421 is supported (regulated) by the support member 422, and hence the movement in the Z direction and the rotation about the X and Y directions are prevented. With this configuration, even when the cable 102 flexes due to the turning of the frame 112, the cable 102 does not move in the Z direction, and hence the cable 102 can be prevented from interfering with a peripheral device. Therefore, the damage on the cable 102 and the shortening of life of the cable 102 can be prevented.

Further, the cable 102 can move in directions of three degrees of freedom, corresponding to the movement in the X and Y directions and the rotation about the Z direction, in which the movement of the cable 102 is not regulated. Therefore, a force is not applied to the cable 102 in the directions of the three degrees of freedom. Therefore, the shortening of life due to a tension or compression force to be applied to the cable 102 can be suppressed.

The three degrees of freedom are sufficient degrees of freedom that are necessary for the cable 102 in the fourth embodiment. Further, the cable 102 is fixed to the movable body 421, and hence friction does not occur between the cable 102 and the movable body 421, and thus the life of the cable 102 can be prevented from being shortened due to the friction with the movable body 421. Further, in the fourth embodiment, the trajectory of the movement of the cable 102 follows a circular arc shape. Therefore, considering the easiness of manufacture of the support member 422, the shape of the gap 412 is determined to be a triangle that is the simplest shape.

As described above, according to the fourth embodiment, when the frame 112 turns relatively to the frame 111, the cable 102 arranged so as to pass above the joint portion J is bent and twisted in accordance with the movement of the frame 112. At this time, the cable 102 is fixed to the movable body 421, and the cable 102 moves together with the movable body 421. The movable body 421 is allowed to move in the direction in which the movement is not regulated by the gap 412 provided between the support member 422 and the frame 111 or the frame 112, and is not allowed to move in the direction in which the movement in regulated. Therefore, by arbitrarily determining the shape of the gap 412, the movement of the cable 102 that moves together with the movable body 421 can be arbitrarily regulated, and the life of the cable 102 can be prevented from being shortened due to insufficiency in degree of freedom of the cable 102. Further, the cable 102 is fixed to the movable body 421, and hence the life of the cable 102 can be prevented from being shortened due to abrasion of the cable 102 by the friction against the movable body 421. Further, the support mechanism 418 is formed merely of the movable body 421 and the support member 422, and hence the structure is simple.

Fifth Embodiment

Figure 15:
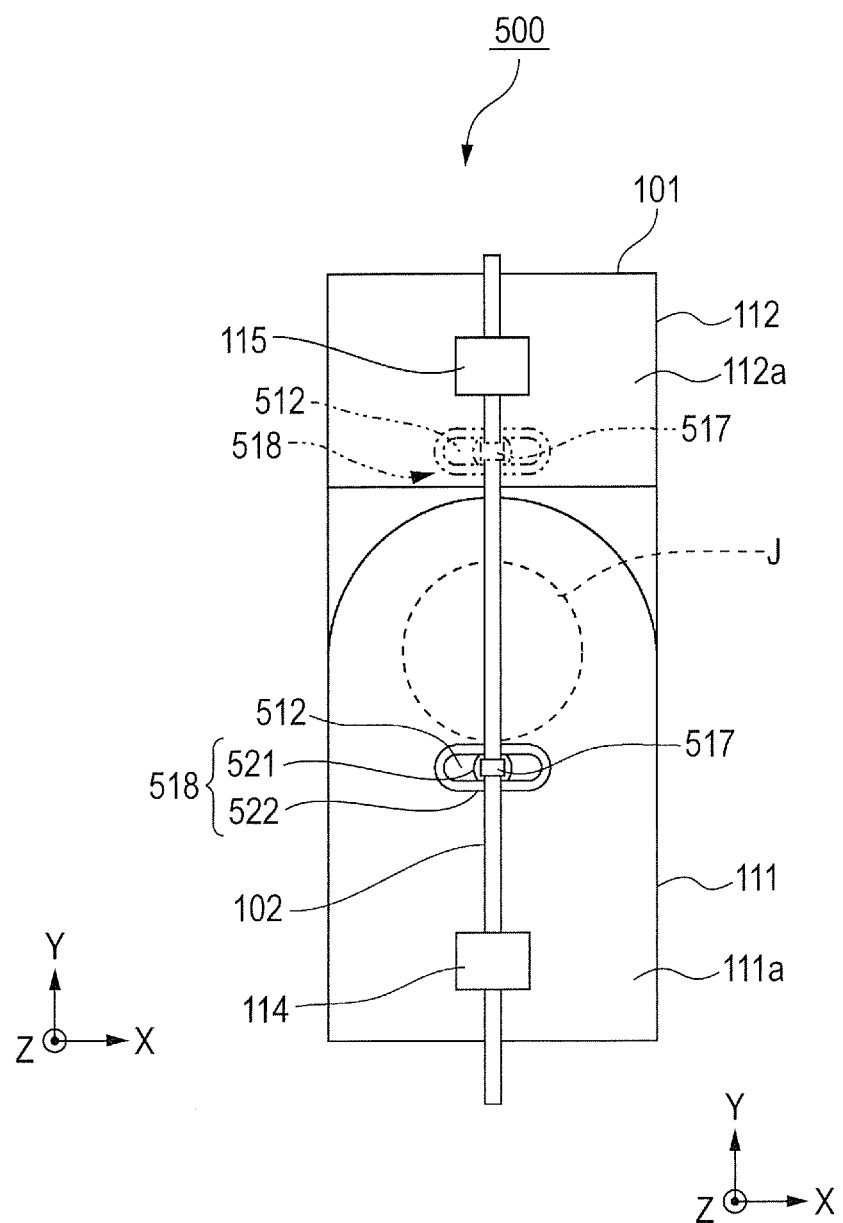
FIG. 15 is a schematic view illustrating a robot according to a fifth embodiment of the present invention.

Next, a robot according to a fifth embodiment of the present invention is described. FIG. 15 is a schematic view illustrating the robot 500 according to the fifth embodiment of the present invention. Note that, the components similar to those of the first embodiment are denoted by the same reference symbols, and description thereof is omitted.

When a drive source or a speed reducer is arranged at the joint portion J, the movable body and the support member may not be arranged near the intermediate position between the fixing member 114 and the fixing member 115 because the drive source and the speed reducer interfere with the movable body and the support member. In the fifth embodiment, a cable fixing member 517 serving as the holding member and a support mechanism 518 including a movable body 521 and a support member 522 are arranged in the vicinity of the fixing member 114 (or the fixing member 115).

The trajectory of the cable 102 obtained when the frame 112 is turned is substantially linear. Therefore, by forming a gap 512 into an oval shape in plan view as illustrated in FIG. 15, the support member 522 may have a shape in a minimal size, and the component may be reduced in size. Further, the gap 512 is provided merely in a necessary movement range, and hence the shape of the support member 522 can be optimized.

At this time, by arranging the movable body 521 and the support member 522 also on the fixing member 115 side to fix the cable 102 by the cable fixing member 517, the deformation amount of the cable 102 can be further reduced in the Z direction. The configuration of the fifth embodiment is effective when the distance between the fixing member 114 and the fixing member 115 is long.

Sixth Embodiment

Figure 16A:
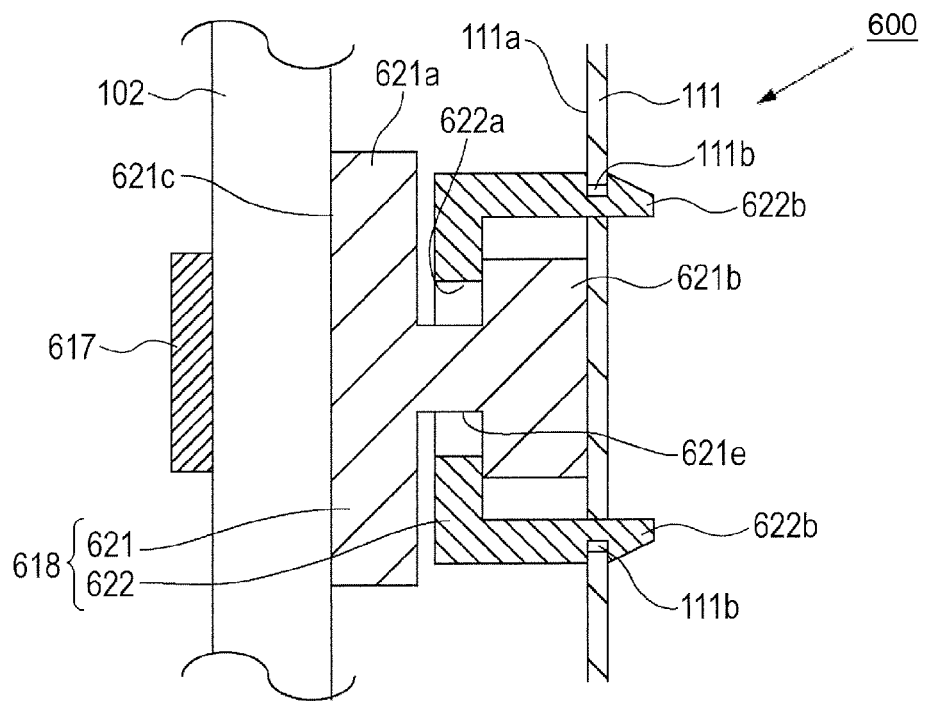
FIGS. 16A and 16B are explanatory views illustrating a main part of a robot according to a sixth embodiment of the present invention.
Figure 16B:
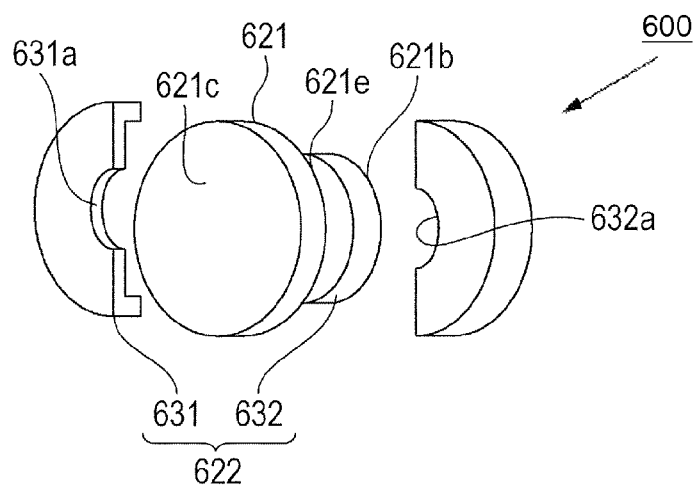

Next, a robot according to a sixth embodiment of the present invention is described. FIGS. 16A and 16B are explanatory views illustrating a main part of the robot 600 according to the sixth embodiment of the present invention. FIG. 16A is a partial sectional view of the main part of the robot. FIG. 16B is an exploded perspective view of a support mechanism. Note that, the components similar to those of the first embodiment are denoted by the same reference symbols, and description thereof is omitted.

As illustrated in FIGS. 16A and 16B, the robot includes a cable fixing member 617 serving as the holding member, and a support mechanism 618. The support mechanism 618 includes a movable body 621 and a support member 622.

The movable body 621 includes a fixing portion 621a for a cable, having a fixing surface 621c for a cable, to which the cable 102 is fixed, and a flange portion 621b. The fixing portion 621a for a cable passes through an opening portion 622a formed in the support member 622 to be exposed to the outside.

In the sixth embodiment, the fixing surface 621c for a cable is formed to have an area that is larger than an opening area of the opening portion 622a. Specifically, a constricted portion 621e is formed in a part of the fixing portion 621a for a cable of the movable body 621, the part corresponding to the opening portion 622a. The constricted portion 621e is arranged so as to pass through the opening portion 622a of the support member 622. With this, regardless of the size of the opening portion 622a, the size of the fixing surface 621c for a cable of the movable body 621 can be freely determined. Therefore, the movable body 621 and the support member 622 can be minimized in size without being affected by the diameter of the cable 102. At this time, the support member 622 is fixed to the side surface 111a of the frame 111 by a plurality of claw portions 622b provided to the support member 622.

When the support member 622 is mounted to the frame 111, through holes 111b opened in the frame 111 are elastically deformed to enable passage of the claw portions 622b therethrough. Thus, the claw portions 622b are hooked to the frame 111. With this, the flange portion 621b of the movable body 621 is supported by being sandwiched between the body side of the support member 622 and the side surface 111a of the frame 111. Therefore, there is no need to provide a fastening member, such as a bolt, for fixing the support member 622, and the structure is simple.

Further, as illustrated in FIG. 16B, the support member 622 includes two divided support member half body 631 and support member half body 632. Further, the support member 622 is assembled to the frame 111 under a state in which cutout parts 631a and 632a forming the opening portion 622a sandwich the constricted portion 621e.

As described above, with the configuration of the sixth embodiment, it is possible to eliminate the correlation in which a part of the movable body 621 to be arranged in the gap is larger than a part for fixing the cable 102. Therefore, the movable body 621 and the support member 622 can be minimized in size.

Seventh Embodiment

Figure 17:
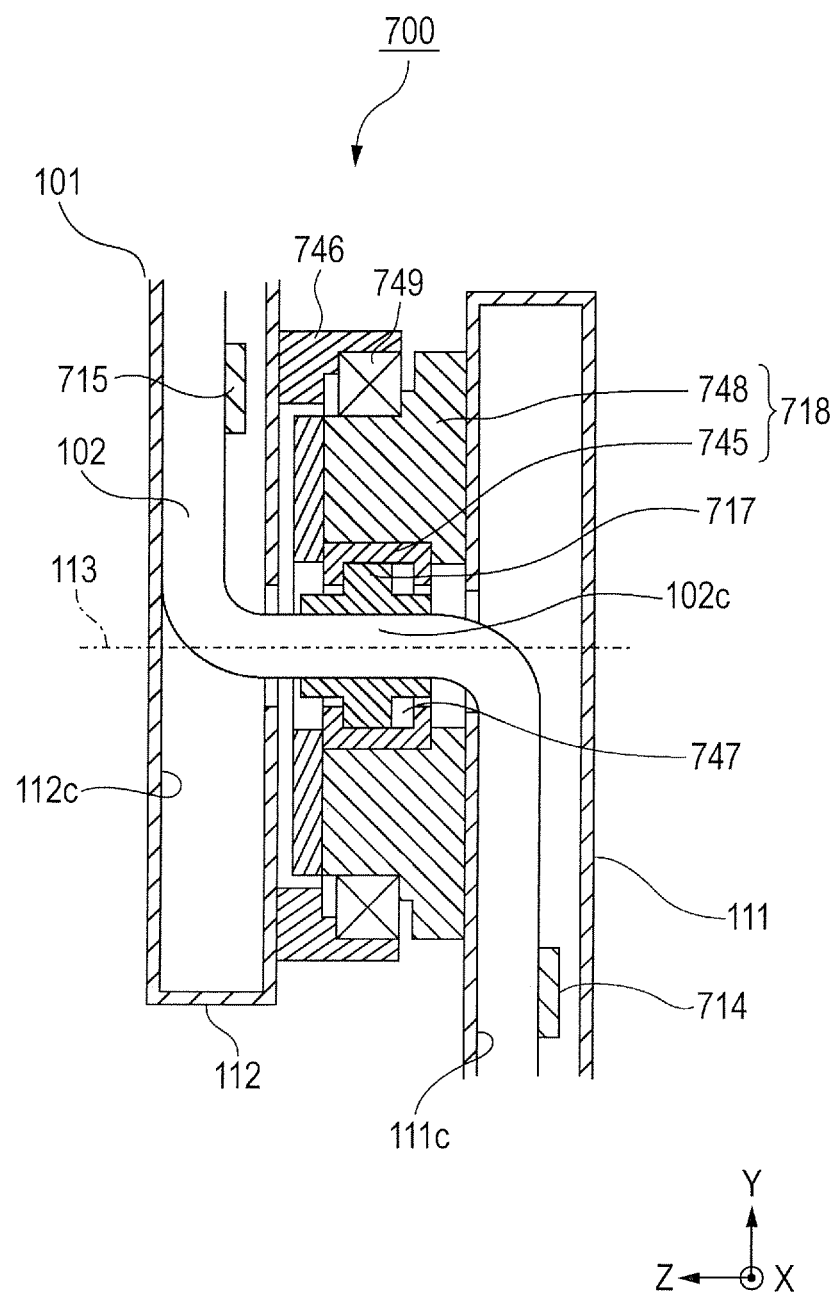
FIG. 17 is a sectional view illustrating a main part of a robot according to a seventh embodiment of the present invention.

Next, a robot according to a seventh embodiment of the present invention is described. FIG. 17 is a sectional view illustrating a main part of the robot according to the seventh embodiment of the present invention. Note that, the components similar to those of the first embodiment are denoted by the same reference symbols, and description thereof is omitted.

In the first to sixth embodiments, the case where the cable 102 is arranged on the outer side of the frames 111 and 112 is described, but the present invention is not limited thereto.

A robot 700 includes the robot arm 101 including the frame 111 and the frame 112 coupled to the frame 111 so as to be turnable about the joint axis 113. Further, the robot 700 includes the cable 102 that passes through the frames 111 and 112 in the axis direction of the joint axis 113 (Z direction), and arranged along side surfaces 111c and 112c on the inner side of the frames 111 and 112, respectively. The robot 700 further includes a fixing member 714 for fixing the cable 102 to the side surface 111c of the frame 111, and a fixing member 715 for fixing the cable 102 to the side surface 112c of the frame 112.

The robot 700 further includes a movable body 717 serving as the holding member for holding a part of the cable 102 between the fixing member 714 and the fixing member 715, that is, a part 102c passing along the joint axis 113 in the axis direction (Z direction). The robot 700 further includes a support mechanism 718 for regulating the movement of the movable body 717 in directions (X and Y directions) orthogonal to the axis direction of the joint axis 113, and for supporting the movable body 717 so that the movable body 717 is movable in the axis direction and rotatable about the joint axis 113.

The support mechanism 718 includes a ring-shaped shaft member 748 mounted to the frame 111, and a support member 745 fixed to a hollow part of the shaft member 748. The outer periphery of the shaft member 748 is coupled to a shaft member 746 through intermediation of a bearing 749, and the shaft member 746 is mounted to the frame 112.

The movable body 717 is provided inside a gap 747 in the support member 745. The movable body 717 can rotate about the Z direction and move in the Z direction inside the gap 747.

The cable 102 passes inside the frame 111 and is fixed to the movable body 717 under a state in which the cable 102 passes through the center of the movable body 717. Moreover, the cable 102 passes through the centers of the shaft member 748 and the shaft member 746, and is fixed to the inside of the frame 112. The cable 102 can rotate about the Z direction and move in the Z direction at a portion fixed to the movable body 717 (in other words, the part 102c).

Therefore, when the frame 112 turns about the joint axis 113, in accordance with the turning movement, the cable 102 rotates and twists about the Z direction and moves in the Z direction. Therefore, a force is not locally applied to the cable 102.

Further, the rotation about the X and Y directions and the movement in the X and Y directions are regulated, and hence the cable 102 can be prevented from interfering with a cable lead-in hole of the frame 111 and a cable lead-in hole of the frame 112.

As described above, the twist and tension force to be applied to the cable 102 can be relaxed, and the life of the cable 102 can be prevented from being shortened due to interference of the cable 102 with the peripheral components.

Further, the cable 102 is fixed to the movable body 717, and hence the friction between the cable 102 and the movable body 717 can be prevented, and the life of the cable 102 can be prevented from being shortened.

Note that, the present invention is not limited to the embodiments described above, and many modifications can be made thereto within the technical idea of the present invention by a person having an ordinary skill in the art.

In the first to seventh embodiments, the case where the robot arm 101 has six frames is described, but the present invention is applicable to the case where the robot arm 101 has two or more frames.

Further, in the first to third embodiments, the case where the support mechanism 118 or 218 is fixed to the frame 111 through intermediation of the panel 131 is described, but the support mechanism 118 or 218 may be directly fixed to the frame 111.

Further, it is preferred that the predetermined posture of the robot arm 101 be a posture in which the frame 112 is located at the center of the turnable range of the frame 112 with respect to the frame 111, but postures other than this posture are not excluded.

Further, in the seventh embodiment, the case where the cable 102 is arranged on the side surface 111c on the inner side of the frame 111 and on the side surface 112c on the inner side of the frame 112 is described, but the present invention is not limited thereto. In the seventh embodiment, the cable 102 may pass through the frame 111 to reach the outer side and may be arranged along the side surface of the frame 111 on the outer side. Further, the cable 102 may pass through the frame 112 to reach the outer side and may be arranged along the side surface of the frame 112 on the outer side.

According to one embodiment of the present invention, a force is prevented from locally concentrating on the cable, and the cable can be prevented from being damaged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-156785, filed Jul. 12, 2012, and Japanese Patent Application No. 2013-099323, filed May 9, 2013, which are hereby incorporated by reference herein in their entirety.

What is claimed is:

1. A robot, comprising:
a robot arm comprising:
a first frame; and
a second frame coupled to the first frame so as to be turnable about a joint axis;
a cable arranged along a side surface of the first frame and a side surface of the second frame;
a first fixing member for fixing the cable to the side surface of the first frame;
a second fixing member for fixing the cable to the side surface of the second frame;
a holding member for holding a part of the cable between the first fixing member and the second fixing member; and
a support mechanism for regulating movement of the holding member in an axis direction of the joint axis, the support mechanism supporting the holding member so that the holding member is movable to follow a bending movement of the cable,
wherein the first fixing member and the second fixing member are arranged so that a part of the cable between the first fixing member and the second fixing member is linear under a state in which the robot arm takes a predetermined posture.

2. A robot according to claim 1,
wherein the support mechanism comprises a rocking member supported by the side surface of the first frame so as to be rockable about an axis parallel to the joint axis, and
wherein the holding member is fixed to the rocking member.

3. A robot according to claim 2, wherein the holding member is fixed to the rocking member at a position near the joint axis with respect to the axis.

4. A robot according to claim 1,
wherein the support mechanism comprises:
a first rocking member supported by the side surface of the first frame so as to be rockable about a first axis parallel to the joint axis; and
a second rocking member supported by the first rocking member so as to be rockable about a second axis different from the first axis and parallel to the joint axis, and
wherein the holding member is fixed to the second rocking member.

5. A robot according to claim 4, wherein the second rocking member is rockably supported by the first rocking member at a position near the joint axis with respect to the first axis.

6. A robot according to claim 1, wherein the support mechanism comprises:
a movable body comprising:
a fixing portion for a cable, having a fixing surface for a cable, to which the cable is fixed by the holding member; and
a flange portion protruded from the fixing portion for a cable in the direction orthogonal to the axis direction, the flange portion being held in surface contact with the side surface of one of the first frame and the second frame; and
a support member for supporting the flange portion by sandwiching the flange portion between the support member and the side surface of the one of the first frame and the second frame, the support member being fixed to the side surface of the one of the first frame and the second frame with a gap provided between the support member and the flange portion, for allowing the movable body to move along the side surface of the one of the first frame and the second frame, the support member having an opening portion formed therein, for avoiding interference with the fixing portion for a cable.

7. A robot according to claim 6, wherein the fixing surface for a cable is formed to have an area larger than an opening area of the opening portion.

8. A robot according to claim 6, wherein the gap has an oval shape in plan view.

9. A robot according to claim 1, wherein the predetermined posture comprises a posture in which the second frame is located at a center of a turnable range of the second frame with respect to the first frame.

* * * * *